United States Patent
Huang et al.

(10) Patent No.: US 8,504,431 B2
(45) Date of Patent: Aug. 6, 2013

(54) METHOD AND SYSTEM FOR MONITORING FORESTRY PRODUCTS

(75) Inventors: Yi-Ping Huang, Taoyuan County (TW); Jenn-Sheng Wu, Hsinchu (TW); Ming-Hsiung Chang, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 505 days.

(21) Appl. No.: 12/364,025

(22) Filed: Feb. 2, 2009

(65) Prior Publication Data

US 2009/0128336 A1  May 21, 2009

Related U.S. Application Data

(62) Division of application No. 11/949,226, filed on Dec. 3, 2007.

(30) Foreign Application Priority Data

Jul. 18, 2007  (TW) .............................. 96126249 A (51) Int. Cl.
*G06G 1/14* (2006.01)
*G06Q 20/00* (2006.01)

(52) U.S. Cl.
USPC .............. 705/22; 705/23; 705/28; 340/12.51; 340/13.26; 340/572.1; D10/106.9

(58) Field of Classification Search
None
See application file for complete search history.

(56) References Cited

U.S. PATENT DOCUMENTS

| | | | |
|---|---|---|---|
| 5,506,565 A | | 4/1996 | de Leon et al. |
| 6,735,630 B1 * | | 5/2004 | Gelvin et al. ................. 709/224 |
| 6,888,458 B2 | | 5/2005 | Carlson |
| 7,100,817 B2 * | | 9/2006 | Leger et al. ................... 235/375 |
| 2006/0049249 A1 * | | 3/2006 | Sullivan ........................ 235/385 |
| 2006/0181414 A1 * | | 8/2006 | Bandy et al. ............. 340/539.22 |
| 2006/0266817 A1 | | 11/2006 | Leger |
| 2007/0069030 A1 * | | 3/2007 | Sauerwein et al. ...... 235/462.46 |

FOREIGN PATENT DOCUMENTS

TW   200506761   2/2005

OTHER PUBLICATIONS http://web.archive.org/web/20060101072413/http://www.itri.org.tw/eng/index.jsp.*
Taiwan Intellectual Property Office, "Office Action", May 20, 2010, Taiwan ROC.
Industrial Technology Research Institute, "Business Contract", Sep. 19, 2007, Taiwan.

\* cited by examiner

*Primary Examiner* — Fateh Obaid
(74) *Attorney, Agent, or Firm* — WPAT, PC; Justin King (57) ABSTRACT

A method and system for monitoring forestry products are provided in the present invention, wherein at least one active communicating device is disposed on a forestry product, and reading and transmitting devices are also disposed in specific locations for building a monitoring and management mechanism to protect the forestry products from stealing. By means the method and system of the present invention, it is capable of providing real-time monitoring information and collecting evidence of illegal actions immediately so that the management staff can control the situation and status of the forestry products, which is useful for improving the efficiency of forestry management. Meanwhile, the present invention may also help to find those lawless persons who steal and fell illegally the forestry resources so as to ensure the safety of working environment for forest managing staff and sustainable management of forest and natural resources.

5 Claims, 13 Drawing Sheets

METHOD AND SYSTEM FOR MONITORING FORESTRY PRODUCTS

FIELD OF THE INVENTION

The present invention relates to a method and system for monitoring forest products, and more particularly, to a forest monitoring method and system for protecting forest resources form being unlawfully exhausted by lawless persons.

BACKGROUND OF THE INVENTION

Comparing with worldwide average of 30 percent, Taiwan's current forest coverage is 58.8 percent that Taiwan is a country with rich forest resources. Forest is considered to be the most massive, complicated, versatile, functional and beneficial ecosystem on Earth that a healthy forest can be the most important stable factor for any biosphere in water catchment area protection, soil erosion protection, environmental filtration/beautification, regional climate control and natural disaster reduction, and so on.

In the forests growing in the Taiwan's mountain areas, there are many indigenous tree species of high economic value, such as juniper, fir and teak. As most of the forests in Taiwan is owned and managed by the government and as those precious trees are spreading within Taiwan's vast mountain reserve, forest management performed only by personnel of Taiwan Forest Bureau can be a very difficult task and thus illegal logging are often heard.

Except for illegal logging, with the rapid progress in biotechnology, many scarce indigenous forest resources such as *antrodia camphorata* and glossy ganoderma that are raw materials for modern medication are also in danger of being exhausted by some illegal means. For instance, those lawless person can cut down a precious hundred-year-old *cinnamomum kanehirai* hay just for harvesting the *antrodia camphorata* growing thereon. Such behavior not only will damage the forest's ecosystem, but also will eventually exhausting all the forest resources along with the forest itself.

Current forest management methods adopted in Taiwan Forest Bureau for preventing illegal logging and harvesting forest resources rely on the management staff to work in shift, 24 hours a day, 7 days a week, and to ambush at the site of illegal logging/harvesting while setting up inspecting posts to intercept the trafficking of illegal goods. However, such method not only may consume and waste many manpower and money, but also it still can neither provide instant protection against those illegal acts, nor can it provides sufficient evidences to nail those lawless persons.

There are already some techniques for improving such disadvantages. One such technique is a forestry management system disclosed in U.S. Pat. No. 7,100,817. The aforesaid system involves a forestry management process that comprises inserting at least one passive radio frequency identification (RFID) tag, e.g. one at the tree trump and one at the root, that has a frequency capable of being read by a scanner into a tree, then scanning the tag. Tags that are inserted into trees may be scanned and associated with specific information concerning the owner, the tree, the area or other aspects of forestry, land and environmental management. In addition, the scanner may be hand-held, or mounted on a car, or fixed stationed at a specific location, and it may also be linked to a GPS system.

Another such technique is a method for tracking silvicultural information disclosed in U.S. Pat. No. 6,888,458, which use at least one RFID tag, being disposed proximate to a tree, for tracking silvicultural information during the product cycle of the tree, such as those information can be used to promote efficient tree cultivation, e.g. cultivation, location, hardness, harvesting, processing, and/or properties of the tree, and providing this information to a computer to be stored.

Although all the aforesaid prior-arts involving the inserting of at least one RFID tag into a tree, they all are only capable of obtaining silvicultural information of the tree in a passive manner. That is, the information obtained by the aforesaid techniques can only be known while being assessed and they are not able to actively inform the management staff if there is any abnormality for enabling the management staff to aware the abnormality in real time.

SUMMARY OF THE INVENTION

The object of the present invention is to provide a method and system for monitoring forest products, by which not only the status of a forest product can be sensed and registered by the use of at least an active communication device, but also the active communication device is enabled to actively issue signals for informing any relating management personnel and thus enabling the status of the forest product to be known at any time, thereby manpower and resource for managing forest products can be reduced.

Another object of the invention is to provide a method and system for monitoring forest products, capable of imaging and identifying any suspected carrier used for transporting illegal forest products, by which not only a process of evidence collection can be performed at any time against illegal acts with high validity, but also the system is able to inform relating authority of such illegal act actively.

One another object of the invention is to provide a method and system for monitoring forest products, capable of issuing an abnormal signal as soon as an abnormality is detected by the system to a management staff with portable communication apparatus by the use of a radio frequency transmission unit for informing the management staff of such abnormality and thus enabling the management staff to aware of the status of forest products at any time.

In an exemplary embodiment of the invention, the method for monitoring forest products comprises the steps of: arranging at least an active communication device at a forest product; making an evaluation to determine the status of the forest product basing on signals emitted from the active communication device; and performing a management process while the status of the forest product is evaluated to be abnormal.

In another exemplary embodiment of the invention, the method for monitoring forest products comprises the steps of: arranging at least an active communication device at a forest product; enabling data registered in the at least one active communication device to be accessible while the at least one active communication device located proximate to at least a specific location; and performing a data recording process while signal emitted from the at least one active communication device is accessed at the at least one specific location.

In one exemplary embodiment of the invention, the system for monitoring forest products comprises: at least an active communication device, being arranged at a forest product for detecting and registering data relating to the status of the forest product and thus emitting a signal in associate with the detected status of the forest product; and at least an access device, each being disposed at a specific location; wherein each of the at least one access device is able to access the signal emitted from the at least one active communication device while the at least one active communication device is within a detection range of the referring access device and thus is enabled to issue a data signal accordingly.

In another exemplary embodiment of the invention, the system for monitoring forest products comprises: at least an active communication device, each being arranged at a forest product and is further comprised of: at least a sensor for detecting status of the forest product and thus generating a sensing signal accordingly, and an active radio frequency identification (RFID) tag coupled to the at least one sensor for enabling the same to register data relating to the status of the forest product and to receive the sensing signal so as to issue a signal corresponding thereto; at least an access device, each being disposed at a specific location for accessing the signal emitted from the at least one active communication device while the at least one active communication device is within a detection range of the referring access device and thus being enabled to issue a data signal accordingly; and at least a portable communication apparatus for receiving the data signal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
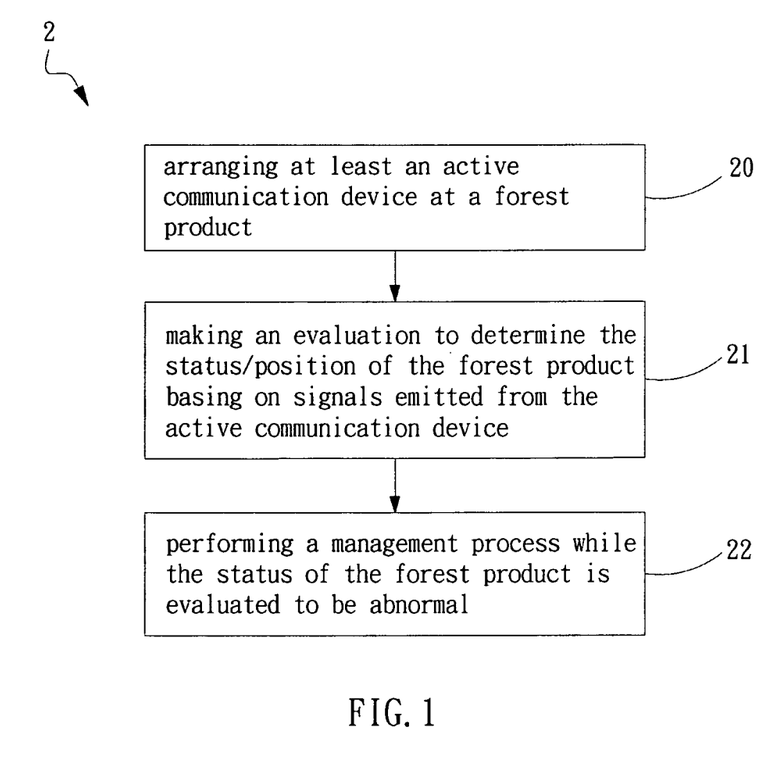
FIG. 1 is a flow chart depicting steps of a method for monitoring forest products according to an exemplary embodiment of the invention.
Figure 2A:
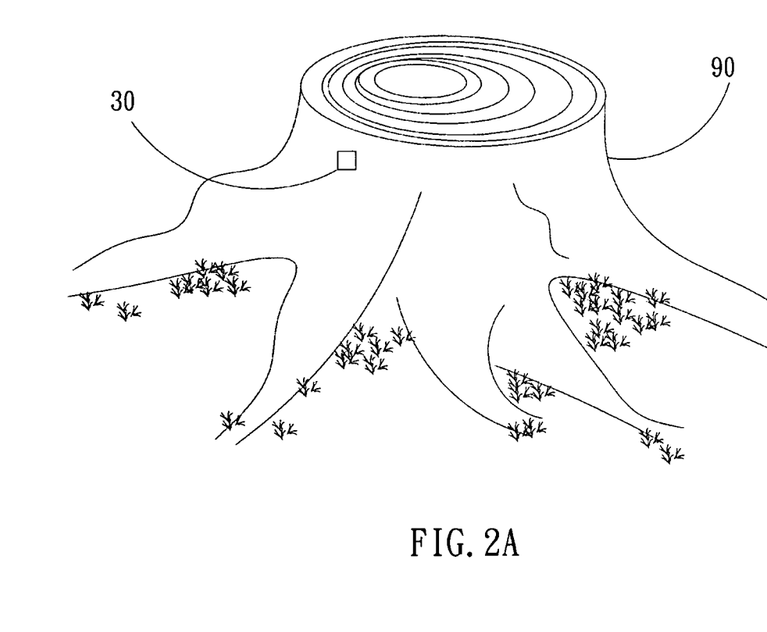
FIG. 2A to FIG. 2C are schematic diagrams showing exemplified forest products.
Figure 2B:
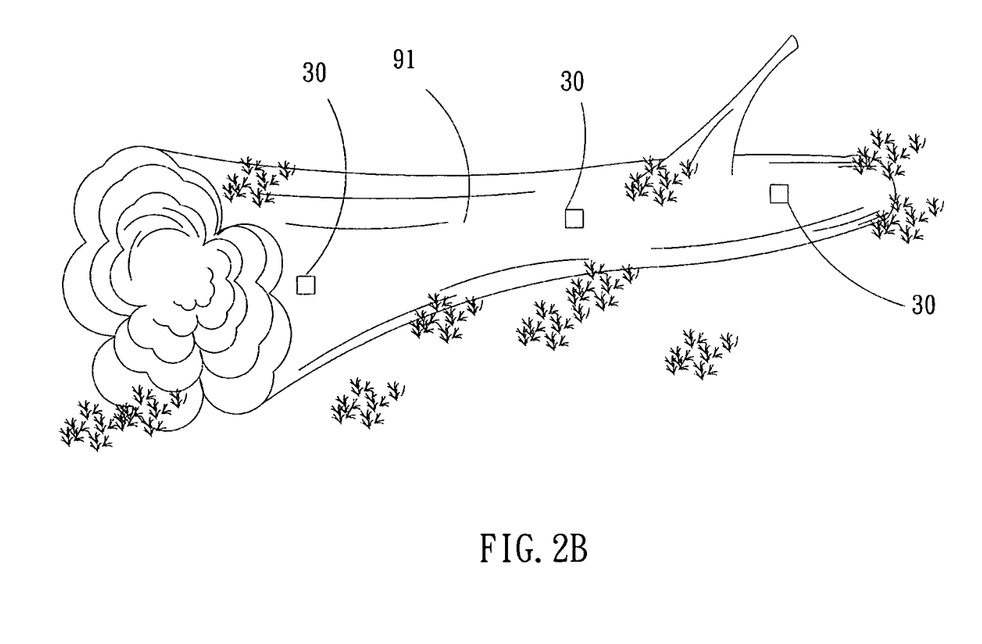
Figure 2C:
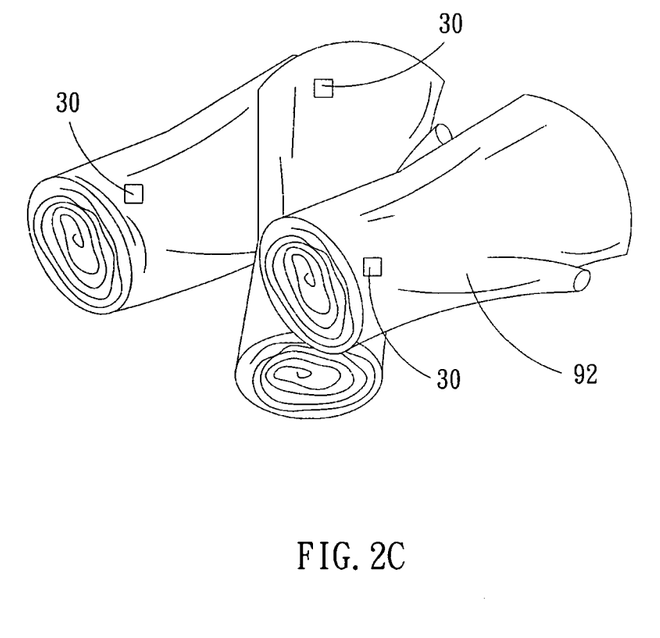

Please refer to FIG. 1, which is a flow chart depicting steps of a method for monitoring forest products according to an exemplary embodiment of the invention. The flow starts from step 20. At step 20, at least an active communication device is arranged at a forest product, and then the flow proceeds to step 21. As shown in FIG. 2A to FIG. 2C, the referring forest product can be tree roots, logs or timbers, and so on, in which the forest product 90 shown in FIG. 2A is the root of a dead log, the forest product 91 shown in FIG. 2B is a dead log that is fell down either by natural force or by man, and the forest products 92 shown in FIG. 2C are timbers. It is noted that, except for woods, there are other kinds of forest products, such as medicinal herbs including *antrodia camphorata*, glossy ganoderma, etc., but are not limited thereby. Moreover, the active communication device can be inserted into the body of the forest product, however, the method for arranging the active communication device at the forest product is not limited thereby.

At step 21, an evaluation is made for determining the status of the forest product basing on signals emitted from the active communication device, and then the flow proceeds to step 22. It is noted that the active communication device used in this invention not only can register information relating to the properties of the forest product such as age, size, hardness, etc., but also it can detect environmental status surrounding the forest product and status variation caused by external forces, such as vibration, velocity/acceleration, temperature, moisture, and so on. Moreover, as the active communication device is designed to issue signals in an active manner, it will emit an abnormal signal. Therefore, when the evaluation performed in step 21 determines that there is an abnormality, the step 22 is initiated to perform a management process.

Figure 3A:
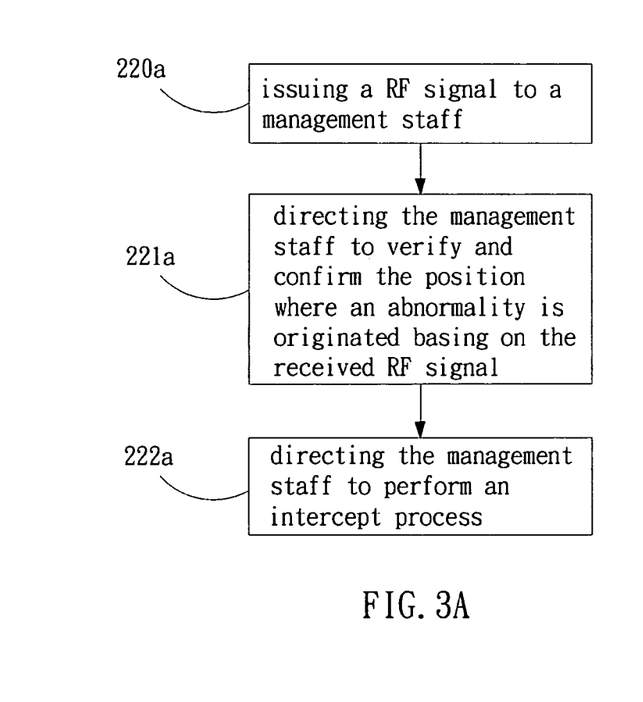
FIG. 3A is a flow chart depicting steps of a management process being performed in a method for monitoring forest products of the invention.

Please refer to FIG. 3A, which is a flow chart depicting steps of a management process being performed in a method for monitoring forest products of the invention. In the management process shown in FIG. 3A, the flow starts at step 220a. At step 220a, when an abnormality is detected, a RF signal is send to a management staff carrying a portable communication apparatus so that the RF signal is received and analyzed by the portable communication apparatus so as to issue an alarming signal to aware the management staff, and then the flow proceeds to step 221a. At step 221a, the management staff will verify and confirm the position where an abnormality is originated basing on the received RF signal, and then the flow proceeds to step 222a. At step 222a, an intercept process is performed. It is noted the intercept process can be perform the management staff if the manage staff is a police officer with law-enforcing ability, otherwise, if the management staff is a Forest Bureau officer, such Forest Bureau officer can use the portable communication apparatus to inform relating law-enforcing personnel to perform the intercept process for arresting lawless persons harvesting/trafficking illegal forest products.

Figure 3B:
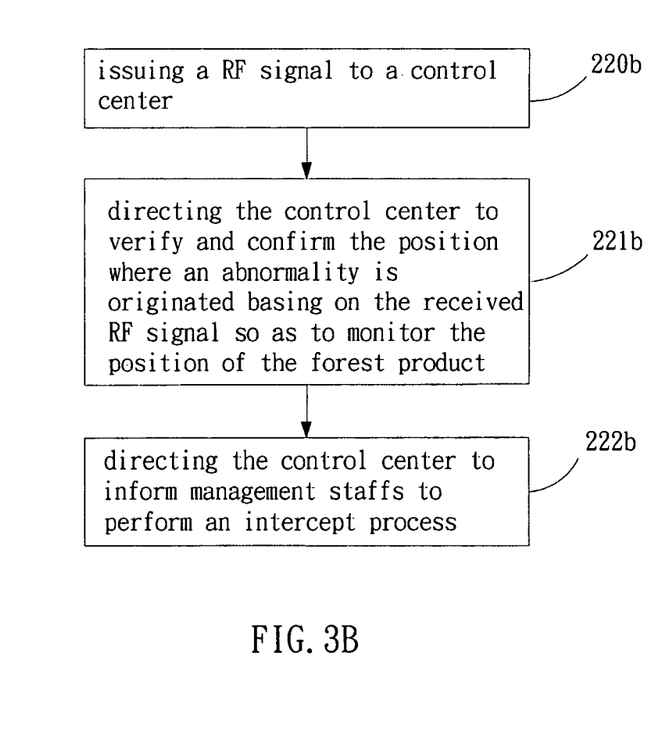
FIG. 3B is a flow chart depicting steps of another management process being performed in a method for monitoring forest products of the invention.

Please refer to FIG. 3B, which is a flow chart depicting steps of another management process being performed in a method for monitoring forest products of the invention. In the management process shown in FIG. 3B, the flow starts at step 220b. At step 220b, when an abnormality is detected, a RF signal is send to a control center, and then the flow proceeds to step 221b. In this exemplary embodiment, the control center is used for personnel dispatch and management that it has at least an electronic calculation unit while each electronic calculation unit can be a workstation or server computer, capable of being used as central computer. In addition, the control center is further linked with a storage database for storing the received RF signals along with the results analyzed and obtained from those RF signals. At step 221b, the control center will verify and confirm the position where an abnormality is originated basing on the received RF signal so as to monitor the position of the forest product, and then the flow proceeds to step 222b. At step 222b, when an abnormality is detected by the control center, the control center will inform management staff to perform an intercept process. It is noted the intercept process is performed in a manner similar to those described in FIG. 3A and thus is not described further herein.

Figure 4A:
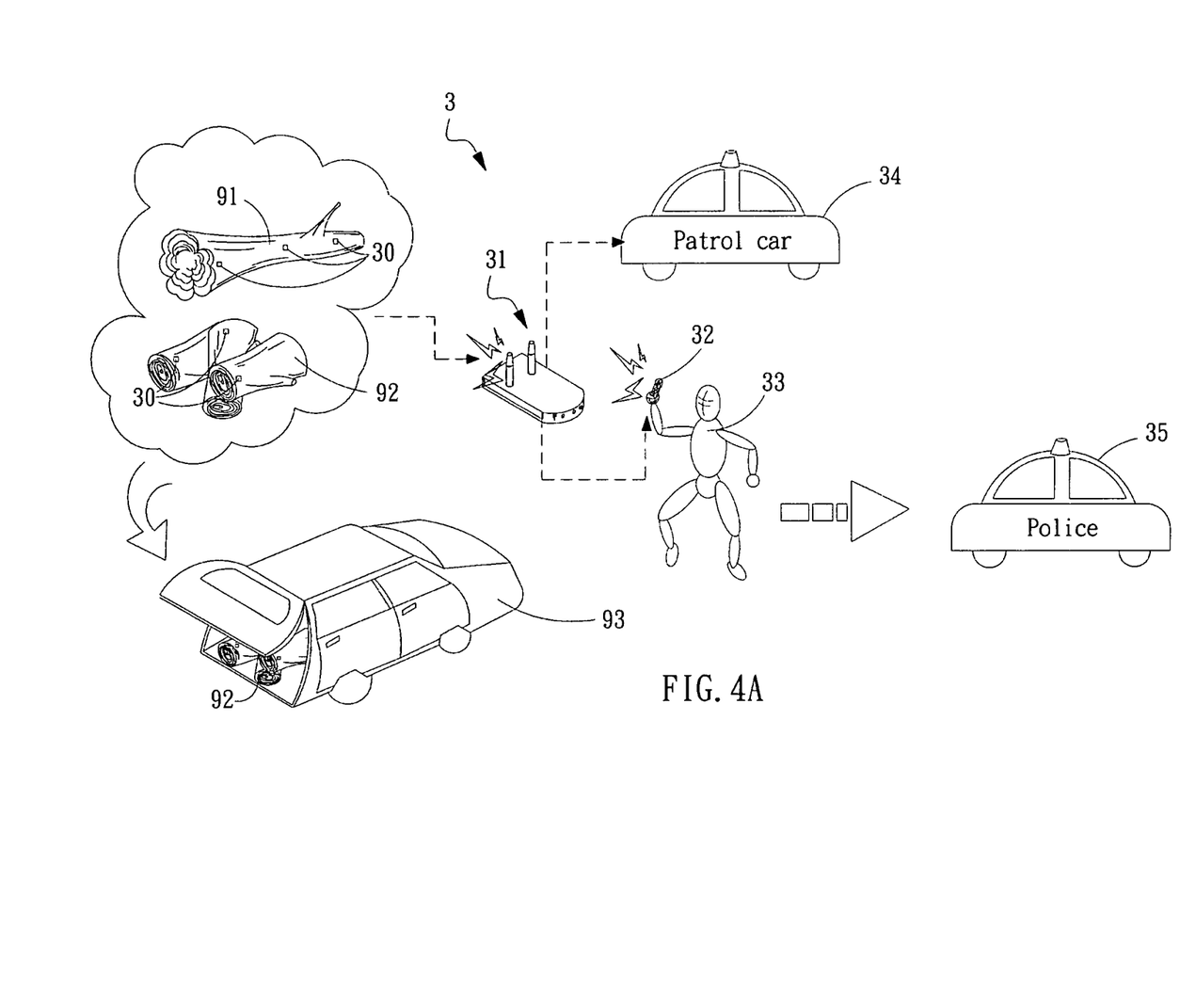
FIG. 4A is a schematic diagram showing a system for monitoring forest products according to a first exemplary embodiment of the invention.

Please refer to FIG. 4, which is a schematic diagram showing a system for monitoring forest products according to a second exemplary embodiment of the invention. In this exemplary embodiment, the system 3 comprises at least an active communication device 30 and at least an access device 31. The at least one active communication device 30 is fitted on a forest product and is used for detecting and registering data relating to the status of the forest product and thus emitting a signal in associate with the detected status of the forest product. It is noted that the active communication device 30 can be an active radio frequency identification (RFID) tag or a device shown in FIG. 5A.

Figure 5A:
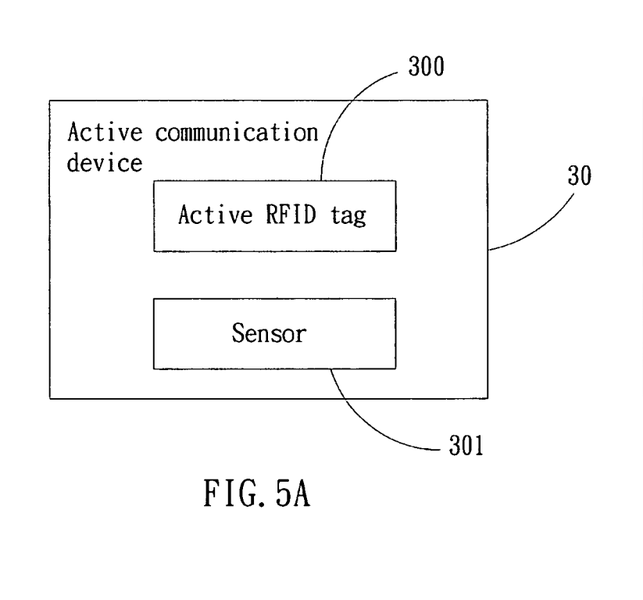
FIG. 5A is a block diagram showing an active communication device according to an exemplary embodiment of the invention.

In FIG. 5A, the active communication device 30 is composed of an active radio frequency identification (RFID) tag 300 and at least a sensor 301 for detecting status of the forest product and thus generating a sensing signal accordingly. Each sensor can be a vibration sensor, a moisture sensor, a temperature sensor or an acceleration/velocity sensor, and so on, but is not limited thereby. In addition, the RFID tag 300 can be integrated with the at least one sensor 301 as a module.

Figure 5B:
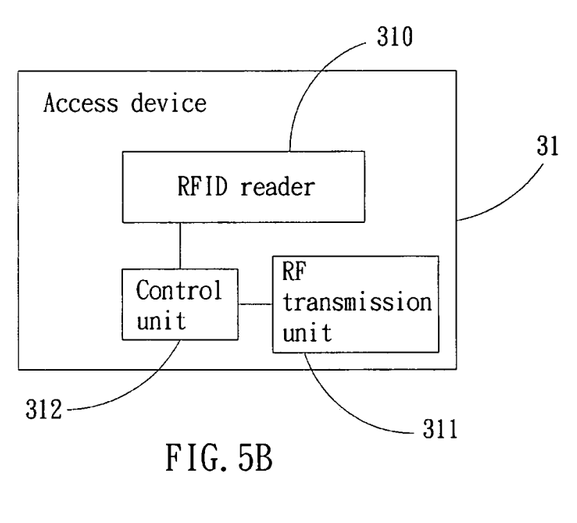
FIG. 5B is a block diagram showing an access device according to an exemplary embodiment of the invention.

In addition, each of the at least one access device 31 in FIG. 4A is disposed respectively at a specific location for enabling the same to access the signal emitted from the at least one active communication device 30 while the at least one active communication device 30 is within a detection range of the referring access device and thus to issue a data signal accordingly. In the embodiment shown in FIG. 4A, only one access device 31 is shown, however, the amount of the access device 31 is not limited thereby, but is dependent upon actual requirement. It is noted that the access device 31 can transmit signal either in a wired manner or in a wireless manner that are known to those skilled in the art and thus are not described further herein. Moreover, the specific location chosen for disposing the access device 31 can be any covert location proximate to the forest product, or positions located on the trafficking path of lawless persons, or in inspection posts. In an exemplary access device 31 shown in FIG. 5B, it is composed of a RFID reader 310, a RF transmission unit 311 and a control unit 312. The RFID reader 310 is used for scanning and reading signals emitted from the active communication device. The control unit 312 is used for evaluating the signal received by the RFID reader 310 for determining whether there is an abnormality; if so, the control unit 312 will direct the RF transmission unit 311 to issue a signal for informing a management staff 33 with a portable communication apparatus 32, or a patrol car 34 with communication device, as shown in FIG. 4A. It is noted that the portable communication apparatus 32 can be a PDA, a cellular phone, or a notebook computer and the like, and the RF transmission unit 311 can be a GSM unit or a GPRS unit, but is not limited thereby.

In normal circumstance, the forest products 91, 92 as those shown in FIG. 4A are motionless so that the active communication devices 30 fitted thereon will issue signals to be determined as normal. However, if they are steal by lawless persons and thus moved, the sensors configured in the active communication devices 30 will detected the vibration or acceleration caused by the moving of the forest products 91, 92 and thus induce the active communication devices 30 to issue signals corresponding to the motions. As soon as such signals are scanned by the access device 31, it will transmit the received signal to the portable communication apparatus 32 used by a management staff 33, and thereby, the management staff will perform a corresponding management process as those described in FIG. 3A and FIG. 3B, such as informing police with law-enforcing ability to intercept the lawless persons.

Figure 4B:
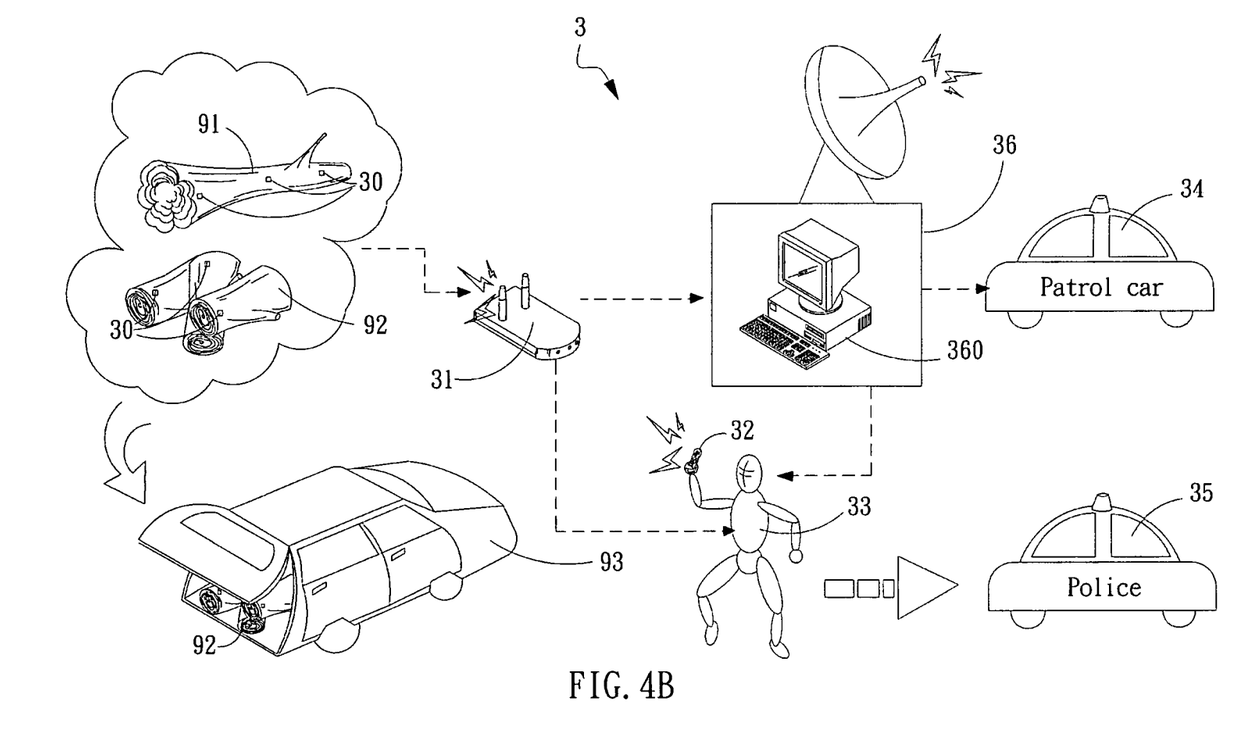
FIG. 4B is a schematic diagram showing a system for monitoring forest products according to a second exemplary embodiment of the invention.

In addition, if the active communication device 30 is only an active RFID tag and is not configured with sensors, such active RFID tag can be defined to issue signals in a periodic manner so that an access device 31 receiving the signal can compare this signal with those previous signals, and if a mismatch is detected, the access device 31 will also issue a signal to alert the management staff 33. Please refer to FIG. 4B, which is a schematic diagram showing a system for monitoring forest products according to a second exemplary embodiment of the invention. In this exemplary embodiment, a control center 36 is added in the system, which has at least an electronic calculation unit 360 capable of being used as central computer for receiving and analyzing signals from the access device 31. In addition, the electronic calculation unit 360 is further linked with a storage database for data storage. The system shown in FIG. 4B is adopted for applying the forest minitoring method of FIG. 3B. It is noted that the management staff of FIG. 4A and the control center of FIG. 4B can exist in one forest minitoring system simultaneously, which is not to be regarded as a departure from the spirit and scope of the invention.

Figure 6:
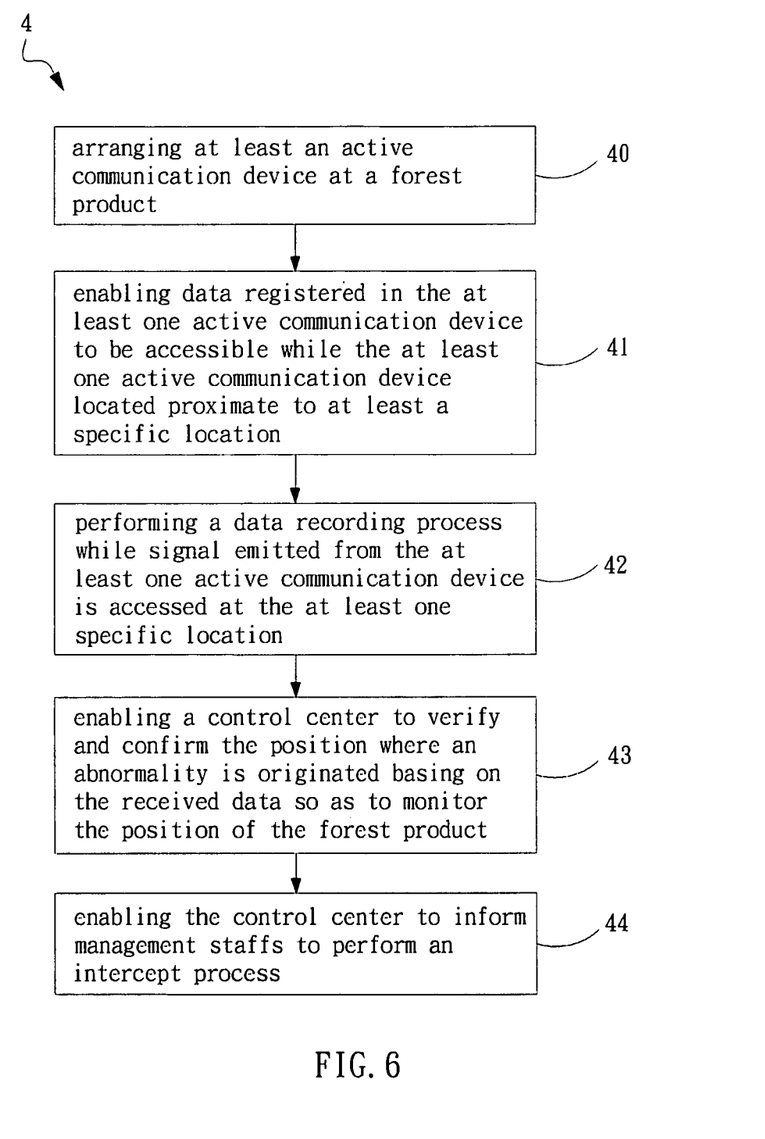
FIG. 6 is a flow chart depicting steps of a method for monitoring forest products according to another exemplary embodiment of the invention.

Please refer to FIG. 6, which is a flow chart depicting steps of a method for monitoring forest products according to another exemplary embodiment of the invention. The flow starts at step 40. At step 40, at least an active communication device is arranged at a forest product in a manner that is similar to those described in the step 20 of FIG. 1 and thus is not described further herein, and then the flow proceeds to step 41. At step 41, data registered in the at least one active communication device are enabled to be accessible while the at least one active communication device located proximate to at least a specific location, and then the flow proceeds to step 42. The characteristic of this embodiment is that: the specific location chosen for disposing the access device 31 can be any covert location proximate to the forest product, or positions located on the trafficking path of lawless persons, or in inspection posts. At step 42, a data recording process is performed while signal emitted from the at least one active communication device is accessed at the at least one specific location.

Figure 7A:
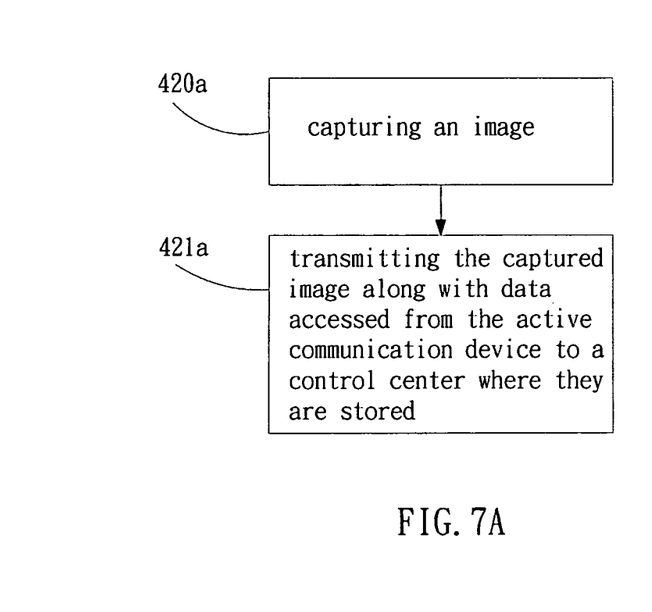
FIG. 7A is a flow chart depicting steps of a data recording process being performed in a method for monitoring forest products of the invention.

Please refer to FIG. 7A, which is a flow chart depicting steps of a data recording process being performed in a method for monitoring forest products of the invention. The data recording process of FIG. 7A starts at step 420a. At step 420a, when there is a signal detected in the step 42 of FIG. 6, an image capturing process is performed, in that the captured image includes license plate image and images of lawless persons, etc., and then the flow proceeds to step 421a. At step 421a, the captured image and the data accessed from the active communication device are transmitted to a control center where they are stored. In addition, referring to FIG. 7B, which is a flow chart depicting steps of another data recording process being performed in a method for monitoring forest products of the invention. The data recording process of FIG. 7B starts at step 420a, in which the image capturing is performed similar to that described in the step 420a, and thus is not described further herein.

Figure 7B:
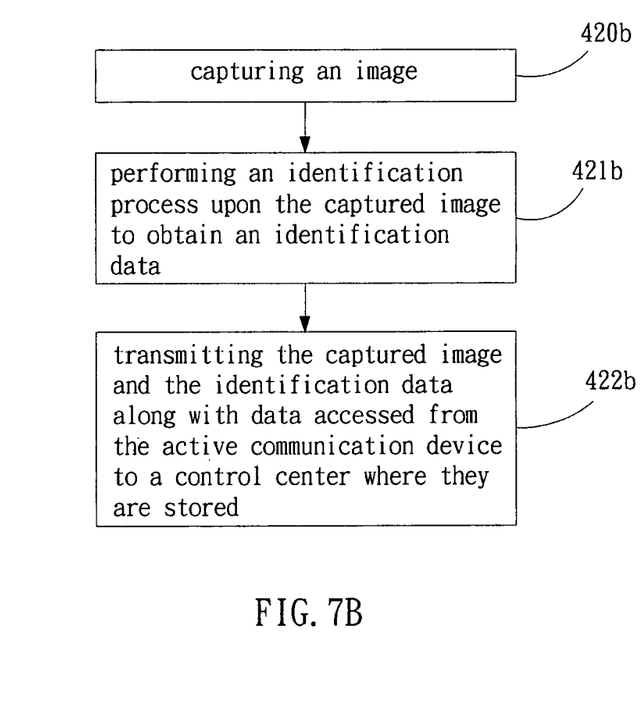
FIG. 7B is a flow chart depicting steps of another data recording process being performed in a method for monitoring forest products of the invention.

At step 421b of FIG. 7B, an identification process is performed upon the captured image to obtain an identification data including license plate number identification, type of the automobile, color of the automobile, traveling direction, features of the lawless persons, and so on, but are not limited thereby, and then the flow proceeds tp step 422b. At step 422b, the captured image, the identification data and the data accessed from the active communication device are transmitted to a control center where they are stored. After the data recording process is accomplished, the step 43 of FIG. 6 is proceeds. At step 43, a control center is used to verify and confirm the position where an abnormality is originated basing on the received data so as to monitor the position of the forest product, and then the flow proceeds to step 44. At step 44, the control center informs management staffs to perform an intercept process, which is performed similar to those described in FIG. 3A and FIG. 3B, and thus are not described further herein.

Figure 8A:
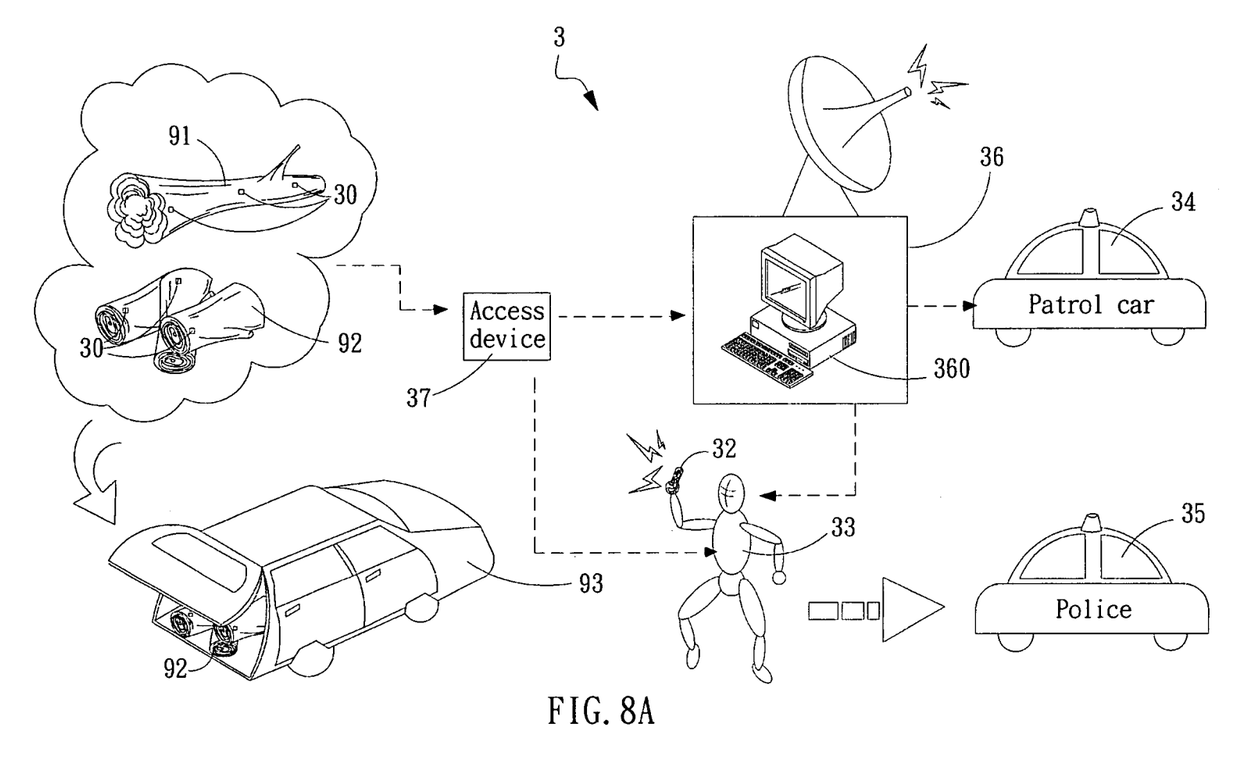
FIG. 8A to FIG. 8C are schematic diagrams showing the application of a system for monitoring forest products according to an embodiment of the invention.
Figure 8B:
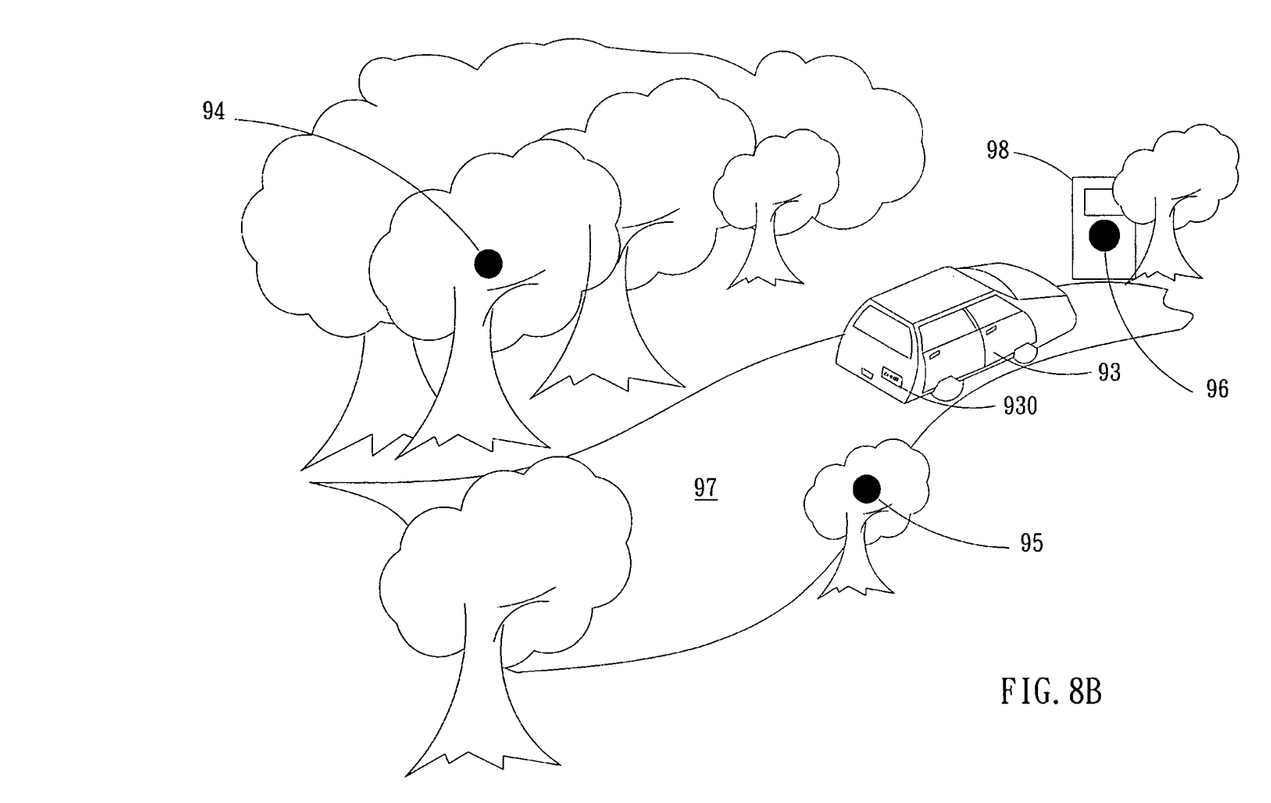
Figure 8C:
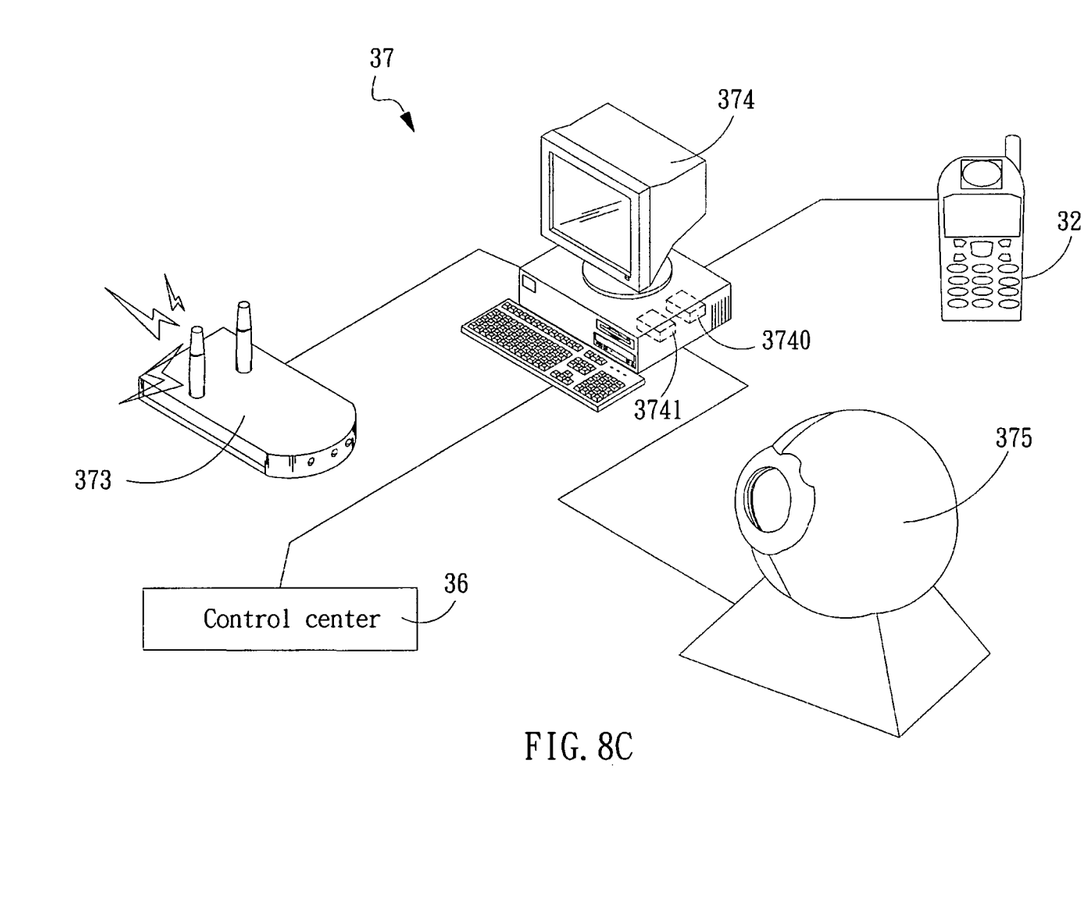

Please refer to FIG. 8A to FIG. 8C, which are schematic diagrams showing the application of a system for monitoring forest products according to an embodiment of the invention. The forest minitoring system 3 comprises: at least an active communication device 31, at least an access device 31 and at least a portable communication apparatus 32. The active communication devices 30 shown in FIG. 5 are disposed respectively on the forest products 91, 92, and each of which is composed of: at least a sensor 301 for detecting status of the forest product and thus generating a sensing signal accordingly, and an active radio frequency identification (RFID) tag 300, coupled to the at least one sensor 301 for enabling the same to register data relating to the statuses of the forest products 91, 92 and to receive the sensing signal so as to issue a signal corresponding thereto. It is noted that the structure and function of the active communication device 30 are the same as that described above and thus are not described further herein.

In addition, each of the at least one access device 37 in FIG. 8A~8C is disposed respectively at a specific location for enabling the same to access the signal emitted from the at least one active communication device 30 while the at least one active communication device 30 is within a detection range of the referring access device 37 and thus to issue a data signal accordingly. It is noted that the access device 37 can transmit signal either in a wired manner or in a wireless manner that are known to those skilled in the art and thus are not described further herein. Please refer to FIG. 8B, which shows several locations capable of being chosen for disposing the access devices. In FIG. 8B, the specific locations 94, 95, and 96 chosen for disposing the access devices 37 can be any covert location proximate to the forest product, or positions located on the trafficking path 97 of lawless persons, or in inspection posts 98.

In FIG. 8C, the access devices 37 comprises a RFID reader 373, a control unit 374, and an imaging unit 375. When a carrier 93 loaded with stolen logs by lawless person travels passing the aforesaid specific locations 93, 94 and 95, the access device 37 will detect signal emitted from the active communication devices 30 fitted on the stolen logs that the access device 37 will then transmitted data accessed from the active communication devices 30 to the control unit 374. In this exemplary embodiment, the control unit 374 is a micro process unit or an electronic device with micro processing ability such as computer, workstation or server, etc. Thereafter, when those data are received by the control unit 374, the control unit 374 will issue signal for directing the imaging unit 375 to capture an image of surrounding environment and then transmit the captured image to the control unit 374.

After the captured image is received by the control unit 374, not only the image can be stored, but also it is analyzed and identified by an image analyzing unit 3740 configured inside the control unit 374. It is noted that the identification result of the image analyzing unit can also be stored. In addition, the control unit 374 can utilize a telecommunication unit 3741, being a GSM device or a GPRS device and the like, to communicate with a management staff 33, a patrol car 34, or a police whoever holding a portable communication apparatus 32, so that the lawless persons can be intercepted and arrested. The information being sent to the portable communication apparatus 32 includes the time when the image was taken, the color of the carrier 93, the license plate number of the carrier 93, the traveling direction, etc., but are not limited thereby. Moreover, the control unit 374 is able to send the captured image, the identification result along with the data accessed by the access device to the control center 36 in a wired manner or in a wireless manner. It is noted that the control center 36 has at least an electronic calculation unit that can be used for directing the aforesaid data to be stored in a storage database. Those data stored on the storage database can be used as evidence for charging or ticketing those lawless persons.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for monitoring forest products, comprising:
   at least an active communication device, being arranged at a forest product for detecting and registering data relating to the status of the forest product and thus emitting a signal in associate with the detected status of the forest product, wherein the active communication device further comprises at least a sensor, for detecting status of the forest product and thus generating a sensing signal accordingly, and an active radio frequency identification (RFID) tag integrated with the at least one sensor as a module within the active communication device for enabling the same to receive the sensing signal so as to issue a signal corresponding thereto;
   at least an access device, each being disposed at a specific location, comprising:
      a control unit, for receiving a control signal emitted from the access device; and
      an imaging unit, coupled to the control unit for receiving signals from the control unit so as to capture at least an image accordingly when said access device detects a signal emitted from any said active communication device; and
   a portable communication apparatus, for receiving information from the control unit;
   wherein the control unit further comprises:
      an image analyzing unit, for receiving the at least one captured image so as to perform an image analysis comprising image recognition and an identification process to generate an identification result; and a telecommunication unit, capable of communicating with a portable communication apparatus;

wherein each of the at least one access device is able to access the signal emitted from the at least one active communication device while the at least one active communication device is within a detection range of the referring access device and thus is enabled to issue a data signal accordingly;

wherein said control unit generates said identification result comprising carrier license plate information, carrier color, carrier trajectory, or features/identification of carrier passengers;

wherein the access device accesses information from a database based upon the identification result;

wherein the information received by the portable communication apparatus from the control unit comprises the time which the image was taken and the identification result.

2. The system of claim 1, wherein the active communication device is an active radio frequency identification (RFID) tag.

3. The system of claim 1, further comprising: an electronic calculation unit, for receiving the data signal while connecting to a storage database.

4. A system for monitoring forest products, comprising:

at least an active communication device, being arranged at a forest product, comprising:

at least a sensor, for detecting status of the forest product and thus generating a sensing signal accordingly; and an active radio frequency identification (RFID) tag, integrated with the at least one sensor as a module within the active communication device for enabling the same to register data relating to the status of the forest product and to receive the sensing signal so as to issue a signal corresponding thereto;

at least an access device, each being disposed at a specific location for accessing the signal emitted from the at least one active communication device while the at least one active communication device is within a detection range of the referring access device and thus being enabled to issue a data signal accordingly, comprising:

a control unit, for receiving a control signal emitted from the access device; and an imaging unit, coupled to the control unit for receiving signals from the control unit so as to capture at least an image accordingly when said access device detects a signal emitted from any said active communication device;

wherein the control unit further comprises:

an image analyzing unit, for receiving the at least one captured image so as to perform an analysis/identification process thereon; and a telecommunication unit, capable of communicating with a portable communication apparatus; and wherein said control unit generates said identification result comprising carrier license plate information, carrier color, carrier trajectory, or features/identification of carrier passengers;

wherein the access device accesses information from a database based upon the identification result;

at least a portable communication apparatus, for receiving from the control unit the data signal comprising the time which the image was taken and the identification result.

5. The system of claim 4, further comprising: an electronic calculation unit, for receiving the data signal while connecting to a storage database.

\* \* \* \* \*